E. M. VAN HOESEN & N. H. BROWN.

CAR COUPLING.

No. 10,567. Reissued Mar. 3, 1885.

Witnesses.
James F. Jobins
John M. Clayton

Inventors.
Eugene M. Van Hoesen
and
Nelson H. Brown
by their Attys.
Howson and Sons N. PETERS, Photo-Lithographer, Washington, D. C.

UNITED STATES PATENT OFFICE.

EUGENE M. VAN HOESEN, OF PREBLE, AND NELSON H. BROWN, OF SYRACUSE, NEW YORK.

CAR-COUPLING.

SPECIFICATION forming part of Reissued Letters Patent No. 10,567, dated March 3, 1885.

Original No. 119,431, dated September 26, 1871; Reissue No. 7,922, dated October 23, 1877; Reissue No. 8,412, dated September 10, 1878; Reissue No. 9,525, dated January 4, 1881. Application for reissue filed April 30, 1884.

*To all whom it may concern:*

Be it known that we, EUGENE M. VAN HOESEN, of Preble, in the county of Cortland, and NELSON H. BROWN, of Syracuse, in the county of Onondaga, and State of New York, have invented a new and Improved Car-Coupling; and we do hereby declare that the following is a full, clear, and exact description thereof, which will enable others skilled in the art to make and use the same, reference being had to the accompanying drawings, forming part of this specification.

Figure 1:
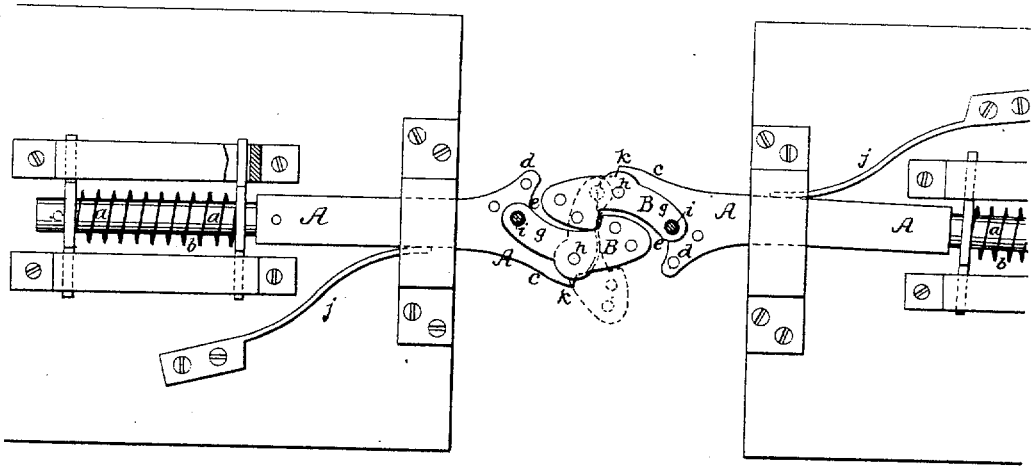
Figure 2:
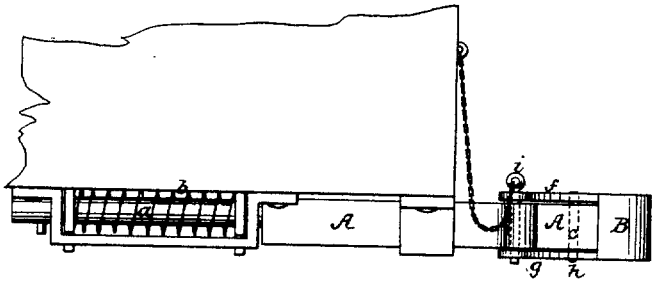
Figure 3:
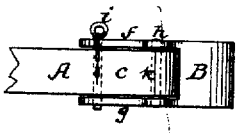

Figure 1 represents an inverted plan or bottom view, partly in section, of our improved car-coupling. Fig. 2 is an inner side view of the same. Fig. 3 is an outer side view of the same.

Similar letters of reference indicate corresponding parts.

This invention relates to a new car-coupling of peculiar construction, and has for its object to avoid difficulties in the connecting of cars, and make their spontaneous disconnection, except when they run off the track, all but impossible.

The invention consists in the application of a peculiar swing-head to the end of the buffer and draft-bar, the swing-head being the connecting means, as hereinafter more fully described.

A in the drawings represents the draw-head and buffer of the coupling. The shank *a* is connected with a spring, *b*, in such manner as to be yielding both to pressure and tension—that is to say, to constitute a yielding buffer as well as draw-head. Its outer end is made as with two fingers, *c* and *d*, between which a cavity, *e*, is formed.

To the outer end of the longer finger *c* is pivoted the swinging head B, with top and bottom plates, *f* and *g*, which overlap the upper and lower faces of the said finger *c*. The pivot-pin *h* pierces the plates *f g* and the finger *c* near the end of the latter. A pin, *i*, is fitted through the plates *f g* and the draw-head A, in order to lock the swing-head to the latter. In that case the swing-head constitutes a hook at the end of the finger *c*.

When two couplings of the above construction meet, they will strike at the points of the swing-heads and crowd each other aside until they are interlocked in the manner shown in Fig. 1. Springs *j*, bearing against the sides of the draw-heads, cause them to thus interlock and be held together. This coupling will always be self-acting when the swing-heads have been secured by the pins *i*. They are stronger than ordinary couplings, as they draw by four pins instead of two, as heretofore. When the cars run off the track, they will readily uncouple of their own accord, not otherwise. The cars can be conveniently uncoupled by drawing out one of the pins *i*, which will release one swing-head and disengage both. When two cars meet which have both or one of the swing-heads not secured by pins *i*, the act of meeting will cause the loose head or heads to come in position for receiving the pin *i*. The cavity between the fingers *c d* of the cross-head may be mortised to admit an ordinary coupling-link which can be locked by the pin *i*. Cars having our improved coupling can thus be connected with such having other coupling. A projecting shoulder, *k*, is formed at the outer side of the draw-head finger *c*, to prevent the swing-head, when loose, from swinging around farther than is required for the position of self-coupling. (See dotted lines in Fig. 1.) The swing-head may be widened by putting extra pieces to either side of it.

Having thus described our invention, we claim as new and desire to secure by Letters Patent—

The swing-head B, shaped as shown, and applied to the finger *c* of the draw-head to constitute a coupling, substantially as set forth.

In testimony whereof we have signed our names to this specification in the presence of two subscribing witnesses.

EUGENE M. VAN HOESEN.
NELSON H. BROWN.

Witnesses:
ERNEST E. MEADE,
WM. J. MCJURY.